United States Patent
Cho et al.

(10) Patent No.: US 10,886,600 B2
(45) Date of Patent: Jan. 5, 2021

(54) ANTENNA AND ELECTRONIC DEVICE INCLUDING THE SAME

(71) Applicant: Samsung Electronics Co., Ltd., Gyeonggi-do (KR)

(72) Inventors: Bum Jin Cho, Gyeonggi-do (KR); Jae Bong Chun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/004,665

(22) Filed: Jun. 11, 2018

(65) Prior Publication Data
US 2018/0358687 A1   Dec. 13, 2018

(30) Foreign Application Priority Data

Jun. 12, 2017   (KR) ........................ 10-2017-0072888

(51) Int. Cl.
| | | |
|---|---|---|
| *H01Q 1/24* | (2006.01) | |
| *H01Q 7/00* | (2006.01) | |
| *H01Q 13/10* | (2006.01) | |
| *G06K 7/10* | (2006.01) | |
| *H04B 5/00* | (2006.01) | |
| *H01Q 1/22* | (2006.01) | |
| *H01Q 1/44* | (2006.01) | |

(52) U.S. Cl.
CPC ......... *H01Q 1/243* (2013.01); *G06K 7/10336* (2013.01); *H01Q 1/2208* (2013.01); *H01Q 1/44* (2013.01); *H01Q 7/00* (2013.01); *H01Q 13/106* (2013.01); *H04B 5/0081* (2013.01)

(58) Field of Classification Search
CPC ...... H01Q 1/243–1/244; H04B 5/0081; G06K 7/10336
See application file for complete search history.

(56) References Cited

U.S. PATENT DOCUMENTS

| | | | |
|---|---|---|---|
| 9,716,307 B2 | 7/2017 | Tsai et al. | |
| 9,847,578 B2 | 12/2017 | Nakano et al. | |
| 10,135,152 B2* | 11/2018 | Ito | ........................ G06K 19/077 |
| 10,490,883 B2 | 11/2019 | Tsai et al. | |
| 10,516,202 B2 | 12/2019 | Tsai et al. | |
| 2014/0125528 A1 | 5/2014 | Tsai et al. | |

(Continued)

FOREIGN PATENT DOCUMENTS

| | | |
|---|---|---|
| CN | 102780065 A | 11/2012 |
| CN | 103703473 A | 4/2014 |

(Continued)

OTHER PUBLICATIONS

Chinese Search Report dated Dec. 30, 2019.
European Search Report dated Oct. 2, 2018.
Chinese Search Report dated Oct. 29, 2020.

*Primary Examiner* — Graham P Smith
*Assistant Examiner* — Amal Patel
(74) *Attorney, Agent, or Firm* — Cha & Reiter, LLC.

(57) ABSTRACT

An electronic device includes a housing including a back cover and a cover glass facing away from the back cover, a coil type radiator disposed between the back cover and the cover glass, at least one printed circuit board (PCB) disposed between the radiator and the cover glass, a communication circuit disposed on the PCB and feeding to the radiator, a first connecting member, a second connecting member, and one or more elements.

8 Claims, 13 Drawing Sheets

(56) References Cited

U.S. PATENT DOCUMENTS

| | | |
|---|---|---|
| 2014/0176382 A1 | 6/2014 | Nakano et al. |
| 2015/0318609 A1 | 11/2015 | Tomonari et al. |
| 2016/0156104 A1 | 6/2016 | Nakano et al. |
| 2016/0164178 A1 | 6/2016 | Komachi et al. |
| 2016/0226132 A1 | 8/2016 | Kim et al. |
| 2017/0005395 A1 | 1/2017 | Komachi et al. |
| 2017/0256845 A1 | 9/2017 | Tsai et al. |
| 2017/0256846 A1 | 9/2017 | Tsai et al. |
| 2017/0317425 A1 | 11/2017 | Ito |

FOREIGN PATENT DOCUMENTS

| | | |
|---|---|---|
| CN | 103811863 A | 5/2014 |
| CN | 106207441 A | 12/2016 |
| CN | 106374227 A | 2/2017 |
| CN | 106410369 A | 2/2017 |
| CN | 206098710 U | 4/2017 |
| KR | 10-2016-0094791 A | 8/2016 |
| WO | 2017/006921 A1 | 1/2017 |

* cited by examiner

ANTENNA AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2017-0072888, filed on Jun. 12, 2017, in the Korean Intellectual Property Office, the disclosure of which is incorporated by reference herein its entirety.

TECHNICAL FIELD

Various embodiments of the present disclosure relate to a technology for improving performance of an antenna.

BACKGROUND

Electronic devices equipped with an antenna, such as smartphones, wearable devices, and the like, have been widely used with the development of mobile communication technologies. An electronic device equipped with an antenna may be paired with another electronic device (e.g., a PC) through the antenna (e.g., a near field communication (NFC) antenna). The electronic device paired with the other electronic device may exchange a message, a photo, or the like with the other electronic device.

The above information is presented as background information only to assist with an understanding of the present disclosure. No determination has been made, and no assertion is made, as to whether any of the above might be applicable as prior art with regard to the present disclosure.

SUMMARY

The antenna may resonate in a specified frequency band. For example, the antenna may resonate in a frequency band between about 13.3 MHz and about 14.6 MHz (a bandwidth of about 1.3 MHz). However, the electronic device may have difficulty in performing communication since the bandwidth is very narrow. For example, the electronic device, when attempting to transmit/receive a message, a photo, or the like through the antenna, may not communicate with other electronic devices that resonate outside the frequency band. Electronic devices with which the electronic device is able to communicate may be limited, which may cause an inconvenience to a user.

The electronic device may supply electric power to the antenna to communicate with other electronic devices. However, in the case where a back cover is made of metal, the current supplied to the antenna may be applied to a user through the back cover. If the current is applied to the user, the user may be injured by electrical shock.

Aspects of the present disclosure are to address at least the above-mentioned problems and/or disadvantages and to provide at least the advantages described below. Accordingly, an aspect of the present disclosure is to provide a method and an electronic device for improving performance of an antenna by using a conductive portion included in a housing of the electronic device.

In accordance with an aspect of the disclosure, an electronic device comprises a back cover comprising: a first area having a first width; a second area having the first width and spaced apart from the first area by a specified distance; and a third area having a second width smaller than the first width and connecting the first area and the second area; a cover glass facing away from the back cover, a coil type radiator disposed between the back cover and the cover glass; at least one printed circuit board disposed between the coil type radiator and the cover glass; a communication circuit disposed on the at least one printed circuit board and configured to feed to the coil type radiator; a first connecting member configured to connect a first point in the first area of the back cover and a second point on the at least one printed circuit board; a second connecting member configured to connect a third point on the at least one printed circuit board and a fourth point in the second area of the back cover; and one or more elements disposed between the second point and the third point on the at least one printed circuit board, wherein the communication circuit transmits or receives a signal in a first frequency band, based on a first electrical path formed by the coil type radiator and transmits or receives a signal in a second frequency band, based on a second electrical path formed by the first connecting member, the second connecting member, and the one or more elements.

In accordance with another aspect of the present invention, an electronic device includes a housing including a back cover and a cover glass facing away from the back cover; a coil type radiator disposed between the back cover and the cover glass; a printed circuit board disposed between the coil type radiator and the cover glass; a communication circuit disposed on the printed circuit board and configured to feed to the coil type radiator; a first connecting member connecting a first point on the back cover and a second point on the printed circuit board; a second connecting member connecting a third point on the printed circuit board and a fourth point on the back cover; and one or more elements disposed between the second point and the third point on the printed circuit board, wherein the communication circuit transmits/receives a signal in a first frequency band, based on a first electrical path formed by the coil type radiator and transmits/receives a signal in a second frequency band, based on a second electrical path formed by the first connecting member, the second connecting member, and the one or more elements.

In accordance with another aspect of the present invention, an electronic device comprises a back cover including a first area, a second area spaced apart from the first area by a specified distance, and a third area connecting the first area and the second area; a cover glass facing away from the back cover; a first printed circuit board disposed between the first area and the cover glass; a second printed circuit board disposed between the second area and the cover glass; a coil type radiator disposed between the back cover and the first printed circuit board; a communication circuit disposed on the first printed circuit board and configured to feed to the coil type radiator; a first connecting member configured to connect a first point in the first area of the back cover and a second point on the first printed circuit board; a second connecting member configured to connect a third point on the second printed circuit board and a fourth point in the second area of the back cover; and one or more elements disposed between the second point and the third point, wherein the communication circuit transmits/receives a signal in a first frequency band, based on a first electrical path formed by the coil type radiator and transmits/receives a signal in a second frequency band, based on a second electrical path formed by the first point, the second point, the third point, and the fourth point.

In accordance with another embodiment, there is an electronic device comprising a back cover; a printed circuit board connected by a conductive path to the back cover; a coil type radiator; and a communication circuit disposed on the printed circuit board and operably connected to the coil type radiator to transmit and receive signals in a first frequency band and configured to transmit and receive signals in a second frequency band using the conductive path.

In accordance with another embodiment, there is an electronic device comprising a back cover; a printed circuit board connected by a conductive path to the back cover; a coil type radiator; and a communication circuit disposed on the printed circuit board and operably connected to the coil type radiator to transmit and receive signals in a first frequency band and configured to transmit and receive signals in a second frequency band using the conductive path.

In accordance with another aspect of the present disclosure, an electronic device includes a housing that includes a front plate, a back plate facing away from the front plate, and a side member surrounding a space between the front plate and the back plate, in which the side member is integrally formed with, or attached to, the back plate, the back plate includes a first conductive portion including a first periphery and an opening adjacent to the first periphery, a second conductive portion including a second periphery extending substantially parallel to the first periphery, and a non-conductive portion disposed between the first periphery and the second periphery and making contact with the first periphery and the second periphery, and the first conductive portion, the second conductive portion, and the non-conductive portion form at least a portion of an outer surface of the back plate, a touch screen display exposed through the front plate, a conductive pattern surrounding the opening of the first conductive portion and located in the space when viewed from above the back plate, a near field communication circuit electrically connected with the conductive pattern, a first conductive path connecting a first point in the first conductive portion and a second point in the second conductive portion and formed in the space, in which the second point is located substantially opposite to the first point with respect to the non-conductive portion, a second conductive path formed inside the back plate and connected between a third point of the first conductive portion and a fourth point of the second conductive portion, in which the third point is spaced apart from the first point by a first distance along the first periphery and the fourth point is spaced apart from the second point by a second distance along the second periphery, and a processor electrically connected with the touch screen display and the near field communication circuit. The first conductive path, at least a portion of the first conductive portion between the first point and the third point along the first periphery, the second conductive path, and at least a portion of the second conductive portion between the fourth point and the second point along the second periphery form a closed loop.

According to embodiments of the present disclosure, it is possible to increase the bandwidth of an antenna.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
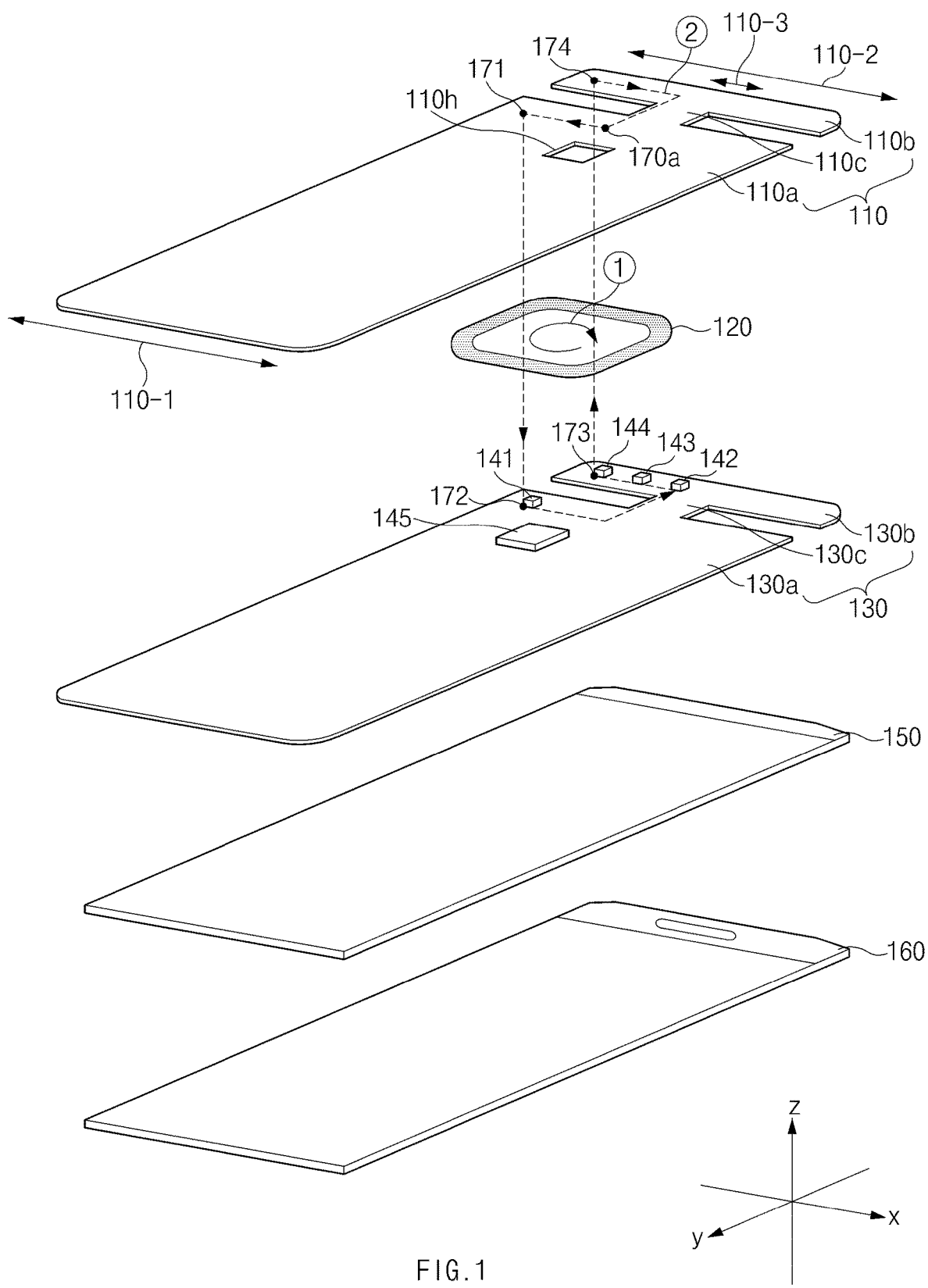
FIG. 1 illustrates an exploded perspective view of an electronic device according to an embodiment.

FIG. 1 illustrates an exploded perspective view of an electronic device according to an embodiment.

In various embodiments, a communication circuit feeds a coil type radiator, which can be used, for example, NFC communication. Another conductive path is formed between the printed circuit board on which the coil antenna is placed and the back cover. The conductive path is formed by connecting members and electrical components. The electrical components can include capacitors and inductors, to allow for a resonant frequency. When the communication circuit 145 feeds the coil antenna a current passes through the conductive path from the printed circuit board and the back cover. The current passing on the conductive path from the printed circuit board and the back cover can be used to receive and transmit signals at another frequency that is different from the frequency of the coil antenna.

Referring to FIG. 1, an electronic device 100 may include a back cover 110, a coil type radiator 120, at least one printed circuit board 130, a display 150, and a cover glass 160. The back cover 110 and the cover glass 160 may form a housing of the electronic device 100.

According to various embodiments, the back cover 110 (or the back side) may form at least an outer surface of a housing of the electronic device 100. For example, the back cover 110 may form at least an outer surface of the electronic device 100 that is directed in a rear direction (e.g., a Z-axis direction). The back cover 110 may be integrated with the electronic device 100, or may be implemented to be detachable by a user. According to an embodiment, the back cover 110 may be formed of reinforced glass, plastic, and/or metal.

According to various embodiments, the back cover 110 may include a first area 110*a* (or a first conductive portion), a second area 110b (or a second conductive portion), and a third area 110c (or a third conductive portion). The first area 110a may be, for example, a portion of the back cover 110 and may constitute almost the entire back cover 110. The second area 110b may be, for example, an area of the back cover 110 that is spaced apart from the first area 110a by a specified distance. The third area 110c may be, for example, an area that connects the first area 110a and the second area 110b. According to an embodiment, a width 110-1 of the first area 110a may be substantially the same as a width 110-2 of the second area 110b. For example, the width 110-1 of the first area 110a and the width 110-2 of the second area 110b may be substantially the same as the measurement of the electronic device 100 in an X-axis direction. According to an embodiment, a width 110-3 of the third area 110c may be smaller than the width 110-1 of the first area 110a (or the width 110-2 of the second area 110b).

According to an embodiment, an insulation member (e.g., plastic) may be disposed in at least a partial area between the first area 110a and the second area 110b. According to another embodiment, the insulation member may cover the third area 110c such that the third area 110c is not visible when viewed from above the back cover 110. For example, when viewed from above the back cover 110, the back cover 110 may look as if it is divided into the first area 110a and the second area 110b by the insulation member. The insulation member may physically separate at least a portion of the first area 110a and at least a portion of the second area 110b.

According to an embodiment, the coil type radiator 120 (or the conductive pattern) may be disposed between the back cover 110 and the at least one printed circuit board 130. In this disclosure, the coil type radiator 120 may be referred to as, for example, a coil of a near field communication (NFC) antenna. According to an embodiment, the coil type radiator 120, when viewed from the at least one printed circuit board 130, may surround an opening 110h (e.g., a camera hole) included in the back cover 110.

According to an embodiment, the at least one printed circuit board 130 may be disposed between the coil type radiator 120 and the display 150. According to an embodiment, the at least one printed circuit board 130 may include a first printed circuit board area 130a, a second printed circuit board area 130b, and a third printed circuit board area 130c. For example, the first printed circuit board area 130a may be disposed between the first area 110a and the display 150, and the second printed circuit board area 130b may be disposed between the second area 110b and the display 150. The third printed circuit board area 130c may connect the first printed circuit board area 130a and the second printed circuit board area 130b.

According to an embodiment, the first printed circuit board area 130a and the second printed circuit board area 130b may be spaced apart from each other by a specified distance. The first printed circuit board area 130a and the second printed circuit board area 130b may be interconnected through specified interconnection wiring (e.g., a flexible printed circuit board (FPCB), a connector, or the like. Although not illustrated, the first printed circuit board area 130a, the second printed circuit board area 130b, and the third printed circuit board area 130c may be formed into a single printed circuit board.

According to an embodiment, the at least one printed circuit board 130 may have components 141, 142, 143, and 144 mounted thereon. For example, the at least one printed circuit board 130 may have the first connecting member 141, the second connecting member 144, and the one or more elements 142 and 143 mounted thereon. The first connecting member 141 and the second connecting member 144 may include, for example, a C-clip. The one or more elements 142 and 143 may include, for example, an inductive element (e.g., an inductor) and a capacitive element (e.g., a capacitor).

According to an embodiment, some of the components 141, 142, 143, and 144 may be disposed on the first printed circuit board area 130a, and the remainder may be disposed on the second printed circuit board area 130b. For example, the first connecting member 141 may be disposed on the first printed circuit board area 130a, and the second connecting member 144 and the one or more elements 142 and 143 may be disposed on the second printed circuit board area 130b. According to an embodiment, the positions where the components 141, 142, 143, and 144 are disposed may differ from those illustrated in FIG. 1.

According to an embodiment, a communication circuit 145 may be electrically connected with the coil type radiator 120 through specified interconnection wiring (e.g., a flexible printed circuit board (FPCB)). The communication circuit 145 may feed the coil type radiator 120 through the specified interconnection wiring. The expression "feeding" used herein may refer to an operation of applying a current to the coil type radiator 120 by the communication circuit 145.

According to an embodiment, when the communication circuit 145 feeds the coil type radiator 120, a first current may flow in the coil type radiator 120 along a first path ①) (or a first electrical path). According to another embodiment, a second current may flow by coupling of the coil type radiator 120 to the second path when the communication circuit 145 feeds the coil type radiator 120. The second current may flow in the back cover 110 and the at least one printed circuit board 130 along a second path ② (or a second electrical path). For example, the second current may flow from a point 170a corresponding to the coil type radiator 120 to a first point 171 and from the first point 171 to a second point 172 via the first connecting member 141. In another example, the second current may flow from the second point 172 to the third point 173 via the one or more elements 142 and 143 and from the third point 173 to a fourth point 174 via the second connecting member 144. The second current may flow back to the point 170a, which corresponds to the coil type radiator 120, from the fourth point 174 via the third area 110c, and may thus form a loop.

According to an embodiment, the electronic device 100 may transmit and receive signals in different frequency bands, based on the first path ① and the second path ②. For example, the electronic device 100 may transmit and receive a signal with a resonant frequency of about 13.8 MHz, based on the first path ①. The electronic device 100 may transmit and receive a signal with a resonant frequency of about 15.5 MHz, based on the second path ②.

According to an embodiment, the electronic device 100 may expand a bandwidth by transmitting and receiving signals through the first path ① and the second path ②. The electronic device 100 may also transmit and receive signals in a frequency band of about 13.0 MHz to about 23.6 MHz. Since the bandwidth in which the electronic device 100 is able to transmit and receive signals is expanded as described above, the types of electronic devices with which the electronic device 100 is able to communicate may be increased.

According to an embodiment, the display 150 (or the touch screen display) may be disposed between the at least one printed circuit board 130 and the cover glass 160. According to another embodiment, the display 150 may be electrically connected with the at least one printed circuit board 130 to output contents (e.g., text, an image, a video, an icon, a widget, a symbol, or the like) or to receive a touch input (e.g., a touch, a gesture, or the like) from the user. The display 150 may have, on a rear surface thereof, a thin sheet or plate made of copper (Cu) or graphite.

According to an embodiment, the cover glass 160 (or the first side) may pass light generated by the display 150. According to another embodiment, the user may perform a touch (including contact using an electronic pen) by touching the cover glass 160 with a part (e.g., a finger) of the user's body. The cover glass 160 may be formed of, for example, reinforced glass, reinforced plastic, a flexible polymer material, or the like and may protect the display 150 and the elements included in the electronic device 100 from external shocks. According to various embodiments, the cover glass 160 may also be referred to as a glass window.

In this disclosure, the contents described with reference to FIG. 1 may be applied to elements having the same reference numerals as those of the electronic device 100 illustrated in FIG. 1.

Figure 2A:
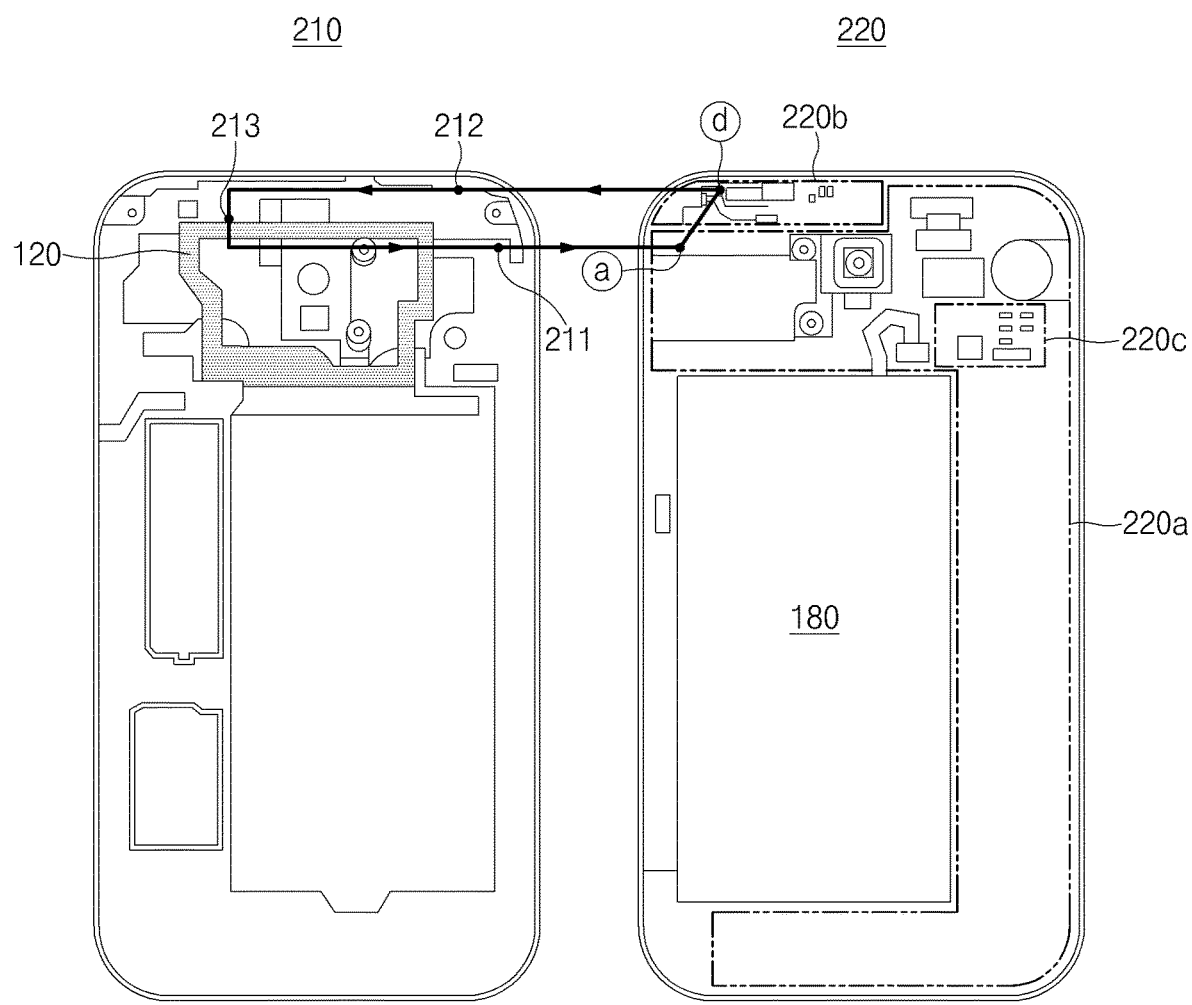
FIG. 2A illustrates a back cover and at least one printed circuit board according to an embodiment.

FIG. 2A illustrates a back cover and at least one printed circuit board according to an embodiment. A back cover 210 and a printed circuit board 220 illustrated in FIG. 2A may be included in the electronic device 100 illustrated in FIG. 1. It shall be understood that the printed circuit board 220 is placed over the back cover 210. The highlighted conductive path (a), (d), 212, and 213 is formed from the printed circuit board 220 and the back cover 210.

Referring to FIG. 2A, the at least one printed circuit board 220 may include a first printed circuit board 220a and a second printed circuit board 220b. For example, the first printed circuit board 220a, together with a battery 180, may be disposed in the same plane. The first printed circuit board 220a may surround, for example, at least a portion of the battery 180. According to an embodiment, the second printed circuit board 220b may be spaced apart from the first printed circuit board 220a by a specified distance and may be disposed in a corner of the electronic device 100. The separation distance between the first printed circuit board 220a and the second printed circuit board 220b may be substantially the same as, for example, the separation distance between a first area (e.g., the first area 110a of FIG. 1) and a second area (e.g., the second area 110b of FIG. 1) of a back cover (e.g., the back cover 110 of FIG. 1).

According to an embodiment, the first printed circuit board 220a and the second printed circuit board 220b may be connected through a lead and the one or more elements 142 and 143. For example, point (a) and point (d) may be electrically connected through a lead. In another example, an inductor or a capacitor may be disposed between point (a) and point (d).

According to an embodiment, the back cover 210 and the printed circuit board 220 may be electrically connected with each other when the back cover 210 and the printed circuit board 220 are combined together. For example, a first point 211 on the back cover 210 and point (a) on the first printed circuit board 220a may be electrically connected with each other through contact. In another example, a second point 212 on the back cover 210 and point (d) on the second printed circuit board 220b may be electrically connected with each other through contact.

According to an embodiment, a current may flow from the back cover 210 to the printed circuit board 220, or from the printed circuit board 220 to the back cover 210, since the back cover 210 and the printed circuit board 220 are electrically connected with each other. For example, a current may flow on the back cover 210 by coupling when a communication circuit (e.g., the communication circuit 145 of FIG. 1) feeds to the coil type radiator 120. The current may flow from the first point 211 to point (a) since the first point 211 and point (a) are electrically connected with each other. In another example, the current may flow from point (d) to the second point 212 via point (a) since point (a) and point (d) are electrically connected with each other and point (d) and the second point 212 are electrically connected with each other. The current may flow back to the first point 211 via a third point 213 (e.g., the third area 110c of FIG. 1) and may thus form a loop.

A communication circuit can communicate using a second frequency band from the coil antenna based on the electrical path formed by points (a), (d), 212, and 213.

Figure 2B:
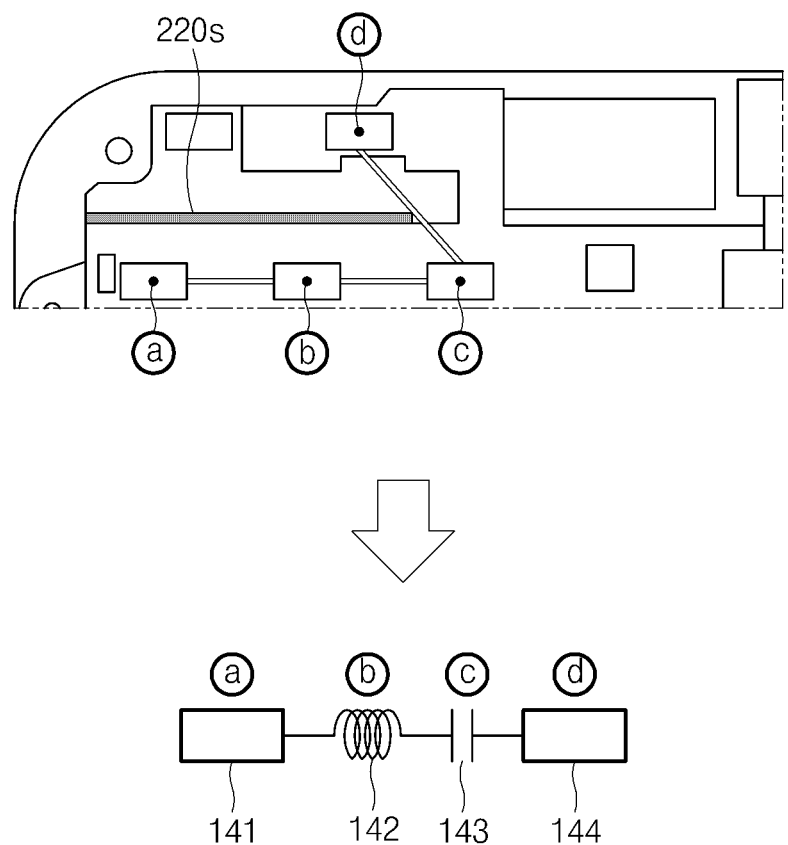
FIG. 2B illustrates a printed circuit board and an equivalent circuit diagram according to an embodiment.

FIG. 2B illustrates a printed circuit board and an equivalent circuit diagram according to an embodiment. FIG. 2B is a blowup of the printed circuit board 220 illustrated in FIG. 2A.

Referring to FIG. 2B, the connecting members 141 and 144 and the one or more elements 142 and 143 may be arranged on the printed circuit board 220. For example, the first connecting member 141 may be disposed at point (a) on the first printed circuit board 220a, and the second connecting member 144 may be disposed at point (d) on the second printed circuit board 220b. The inductor 142 and the capacitor 143 may be disposed, for example, at point (b) and point (c) between point (a) and point (d), respectively. Meanwhile, the positions of the connecting members 141 and 144 and the one or more elements 142 and 143 are not limited thereto. Inductance and capacitance values of elements 142 and 143 can be selected to have a particular resonant frequency. The path formed by connecting members 141 and 144 can received and transmit signals on the resonant frequency.

According to an embodiment, a non-conductive area 220s may be formed on at least a portion of the printed circuit board 220. The connecting members 141 and 144 and the one or more elements 142 and 143 may be arranged to bypass the non-conductive area 220s. For example, as illustrated in FIG. 2B, the first connecting member 141 and the first element 142 may be connected together, the first element 142 and the second element 143 may be connected together, and the second element 143 and the second connecting member 144 may be connected together. Accordingly, the connecting members 141 and 144 and the one or more elements 142 and 143 may bypass the non-conductive area 220s.

According to an embodiment, the first connecting member 141 may make an electrical connection between the first printed circuit board 220a and the back cover 210. For example, in the case where the printed circuit board 220 and the back cover 210 are combined together, the first point 211 and point (a) may be connected through the first connecting member 141. The description of the first connecting member 141 may also be applied to the second connecting member 144. For example, in the case where the printed circuit board 220 and the back cover 210 are combined together, the second point 212 and point (d) may be connected through the second connecting member 144.

According to an embodiment, the first element 142 (e.g., an inductor) may be open in a frequency band (e.g., about 600 MHz) higher than a frequency band (e.g., about 13.8 MHz) for short range communication to shield electromagnetic interference of an antenna implemented with the second area 110b (hereinafter, referred to as the upper antenna). For example, the electronic device 100 may feed to the upper antenna and the coil type radiator 120 to transmit and receive signals in multiple frequency bands. In this case, the first element 142 (e.g., an inductor) may shield electromagnetic interference caused by the upper antenna to allow the coil type radiator 120 to transmit and receive a signal in a frequency band (e.g., about 13.8 MHz) for short range communication. According to an embodiment, the inductance of the first element 142 (e.g., an inductor) may be, for example, about 82 nH.

According to an embodiment, the second element 143 (e.g., a capacitor) may be open in a frequency band (e.g., about 13.8 MHz) for short range communication to shield electromagnetic interference of the coil type radiator 120. For example, the second element 143 may shield electromagnetic interference caused by the coil type radiator 120 to allow the upper antenna to transmit and receive a signal in a frequency band (e.g., about 600 MHz) for long range communication. According to an embodiment, the capacitance of the second element 143 may be, for example, about 820 pF.

Figure 2C:
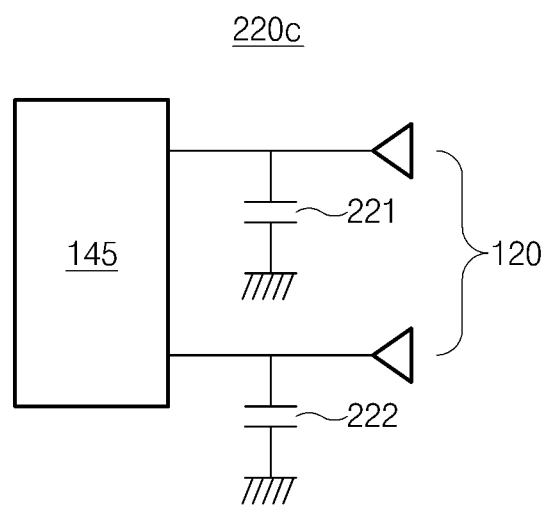
FIG. 2C illustrates an equivalent circuit diagram of a communication circuit and a coil type radiator according to an embodiment.

FIG. 2C illustrates an equivalent circuit diagram of a communication circuit and a coil type radiator according to an embodiment. FIG. 2C is a blowup of a partial area 220c of the first printed circuit board 220a illustrated in FIG. 2A.

Referring to FIG. 2C, the communication circuit 145 (e.g., the communication circuit 145 of FIG. 1) may be electrically connected with the coil type radiator 120. According to another embodiment, capacitors 221 and 222 may be connected in parallel between the communication circuit 145 and the coil type radiator 120. For example, one end of each of the capacitors 221 and 222 may be connected to a point between the communication circuit 145 and the coil type radiator 120. An opposite end of each of the capacitors 221 and 222 may be grounded.

According to an embodiment, the capacitors 221 and 222 may match impedances between the communication circuit 145 and the coil type radiator 120. The resonant frequency of the coil type radiator 120 may vary depending on the extent to which the impedances between the communication circuit 145 and the coil type radiator 120 are matched. For example, the resonant frequency of the coil type radiator 120 may be about 13.8 MHz in the case where the capacitance of the capacitors 221 and 222 is 320 pF.

Figure 2D:
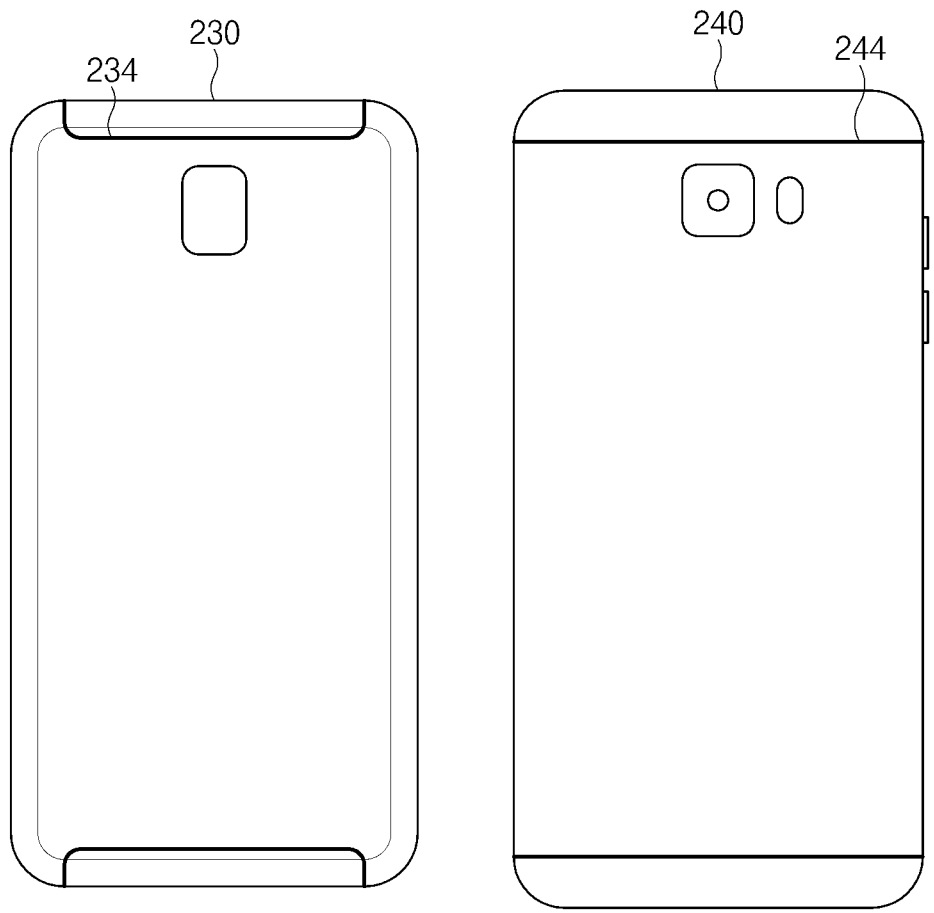
FIG. 2D illustrates back covers according to various embodiments.

FIG. 2D illustrates back covers according to various embodiments.

Referring to FIG. 2D, back covers 230 and 240 may include conductive areas (e.g., the first area 110a and the second area 110b of FIG. 1) and non-conductive areas 234 and 244. At least a portion of the conductive areas may operate as an antenna radiator that radiates a signal to an external electronic device. The non-conductive areas 234 and 244 may physically separate the conductive areas. An insulation member (e.g., plastic) may be disposed in the non-conductive areas 234 and 244, and the non-conductive areas 234 and 244 may be referred to as a slit.

According to an embodiment, the non-conductive areas 234 and 244 may have various lengths or shapes. For example, the non-conductive area 234 of the back cover 230 may be formed in the shape of "U" on the back cover 230. In another example, the non-conductive area 244 of the back cover 240 may be formed in the shape of a straight line on the back cover 240. According to various embodiments of the present disclosure, the lengths or shapes of the non-conductive areas are not limited to those illustrated in FIG. 2D.

Figure 3:
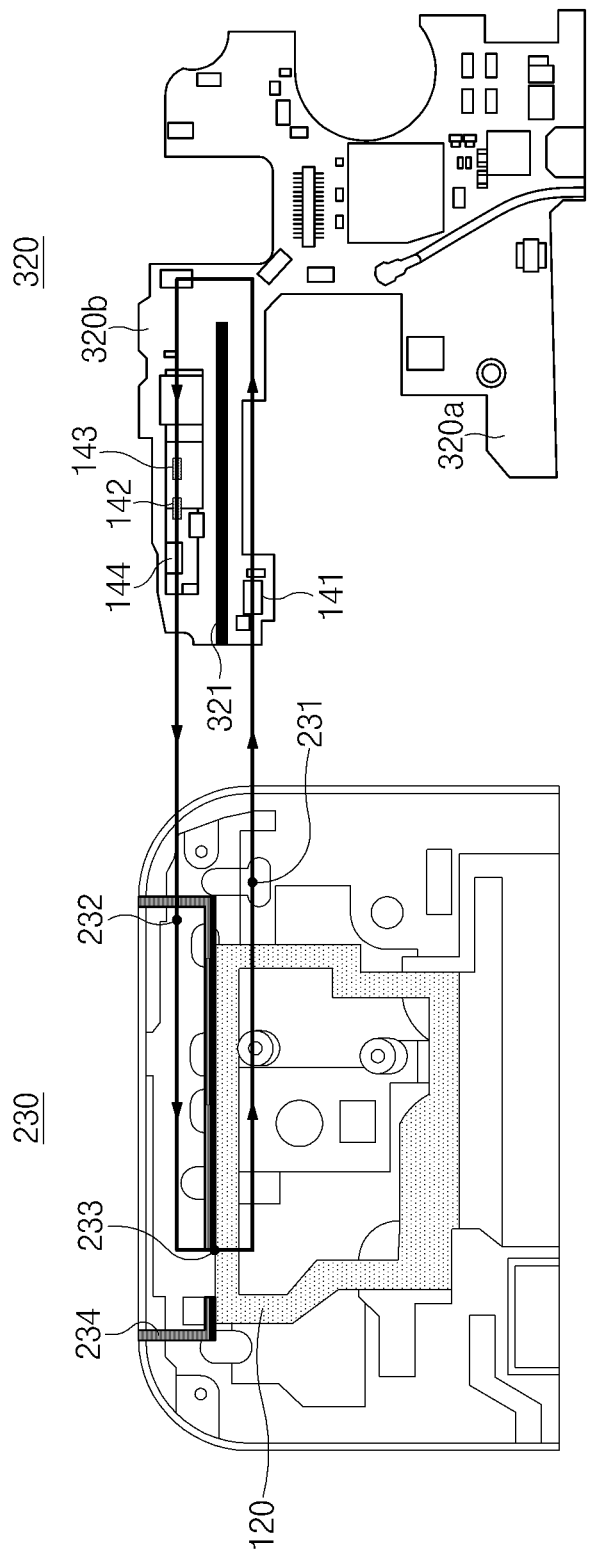
FIG. 3 illustrates a back cover and at least one printed circuit board according to another embodiment.

FIG. 3 illustrates the back cover 230 and at least one printed circuit board according to another embodiment. The back cover 230 and a printed circuit board 320 illustrated in FIG. 3 may be included in the electronic device 100 illustrated in FIG. 1.

Referring to FIG. 3, the printed circuit board 320 may be divided into a first printed circuit board 320a and a second printed circuit board 320b. According to an embodiment, a non-conductive area 321 may be formed between the first printed circuit board 320a and the second printed circuit board 320b, and the first printed circuit board 320a and the second printed circuit board 320b may be separated by the non-conductive area 321 (e.g., a fill cut area).

According to an embodiment, the first printed circuit board 320a and the second printed circuit board 320b may be connected through a lead and the one or more elements 142 and 143. For example, the first connecting member 141 may be disposed on the first printed circuit board 320a, and the second connecting member 144 may be disposed on the second printed circuit board 320b. The first connecting member 141 and the second connecting member 144 may be electrically connected through a lead. The inductor 142 or the capacitor 143 may be disposed between the first connecting member 141 and the second connecting member 144. In this case, the lead and the one or more elements 142 and 143 may bypass the non-conductive area 321 so as not to overlap the non-conductive area 321.

According to an embodiment, a current flowing in the back cover 230 may bypass the non-conductive area 321 since the lead and the one or more elements 142 and 143 bypass the non-conductive area 321. For example, a current may flow on the back cover 230 by coupling when a communication circuit (e.g., the communication circuit 145 of FIG. 1) feeds to the coil type radiator 120. The current may flow through a first point 231, the first connecting member 141, the capacitor 143, the inductor 142, the second connecting member 144, a second point 232, and a third point 233 (e.g., the third area 110c of FIG. 1).

According to certain embodiments, the communication circuit can transmit/receive a signal in a second frequency band different from a frequency band used by the coil antenna based on the path formed through first point 231, the first connecting member 141, the capacitor 143, the inductor 142, the second connecting member 144, a second point 232, and a third point 233

Figure 4:
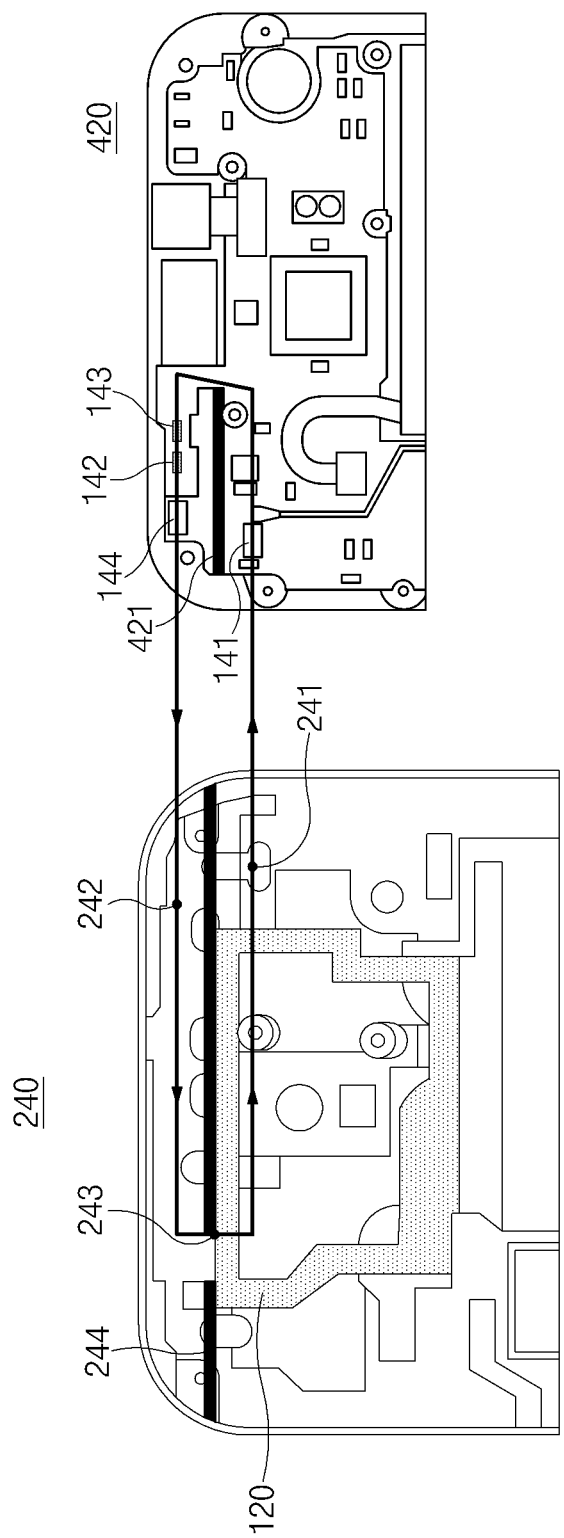
FIG. 4 illustrates a back cover and a printed circuit board according to another embodiment.

FIG. 4 illustrates a back cover and a printed circuit board according to another embodiment. The back cover 240 and a printed circuit board 420 illustrated in FIG. 4 may be included in the electronic device 100 illustrated in FIG. 1.

Referring to FIG. 4, the printed circuit board 420 may be a single element, unlike the printed circuit boards 130 and 220 illustrated in FIGS. 1 and 2. In this case, the connecting members 141 and 144 and the one or more elements 142 and 143 may be arranged on the printed circuit board 420. The connecting members 141 and 144 and the one or more elements 142 and 143 may be interconnected through, for example, leads.

According to an embodiment, the back cover 240 and the printed circuit board 420 may be electrically connected with each other when the back cover 240 and the printed circuit board 420 are combined together. For example, the first connecting member 141 may connect a first point 241 on the back cover 140 and the printed circuit board 420, and the second connecting member 144 may connect a second point 242 on the back cover 240 and the printed circuit board 420.

According to an embodiment, a current may flow from the back cover 240 to the printed circuit board 420, or from the printed circuit board 420 to the back cover 240, since the back cover 240 and the printed circuit board 420 are electrically connected with each other. For example, a current may flow on the back cover 240 by coupling when the communication circuit 145 feeds to the coil type radiator 120. The current may flow through the first point 241, the first connecting member 141, the capacitor 143, the inductor 142, the second connecting member 144, the second point 242, and a third point 243 (e.g., the third area 110c of FIG. 1).

According to certain embodiments, the communication circuit can transmit/receive a signal in a second frequency band different from a frequency band used by the coil antenna based on the path formed through first point 241, the first connecting member 141, the capacitor 143, the inductor 142, the second connecting member 144, the second point 242, and a third point 243

Figure 5:
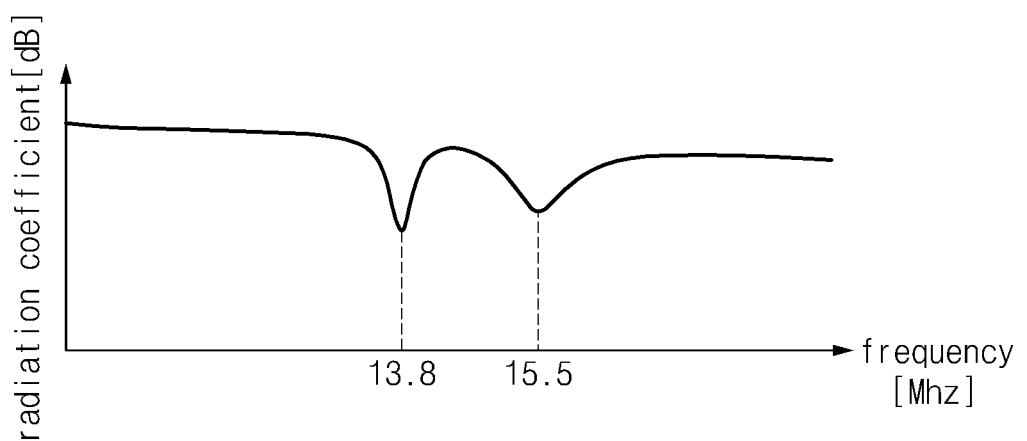
FIG. 5 illustrates radiation coefficients of an electronic device according to an embodiment.

FIG. 5 illustrates radiation coefficients of an electronic device according to an embodiment. The radiation coefficients illustrated in FIG. 5 may represent radiation coefficients of the electronic device (e.g., the electronic device 100 of FIG. 1) when a communication circuit (e.g., the communication circuit 145 of FIG. 1) feeds a coil type radiator (e.g., the coil type radiator 120 of FIG. 1).

Referring to FIG. 5, the electronic device (e.g., the electronic device 100 of FIG. 1) may transmit and receive signals in different frequency bands through an electrical path (e.g., the first path ① of FIG. 1) formed based on the coil type radiator 120 and an electrical path (e.g., the second path ② of FIG. 1) coupled with the coil type radiator 120. For example, the electronic device 100 may transmit and receive a signal having a resonant frequency of about 13.8 MHz, based on the first path ① and may transmit and receive a signal having a resonant frequency of about 15.5 MHz, based on the second path ②. According to an embodiment, the corresponding signal is not limited to a specific frequency band and may be a signal for short range communication that is distinguished from a signal for long range communication. For example, the corresponding signal may include a signal for magnetic secure transmission (MST), near field communication (NFC), or wireless charging.

According to an embodiment, the electronic device 100 may expand a bandwidth by transmitting and receiving signals through the first path ① and the second path ②. In FIG. 5, the electronic device 100 may also transmit and receive signals in a frequency band for short range communication between 13 MHz and 23.6 MHz. For example, when the electronic device 100 transmits and receives signals based on the first path ① and the second path ②, the bandwidth may increase by about 10 MHz, compared with when the electronic device 100 transmits and receives signals based on the first path ①.

Figure 6A:
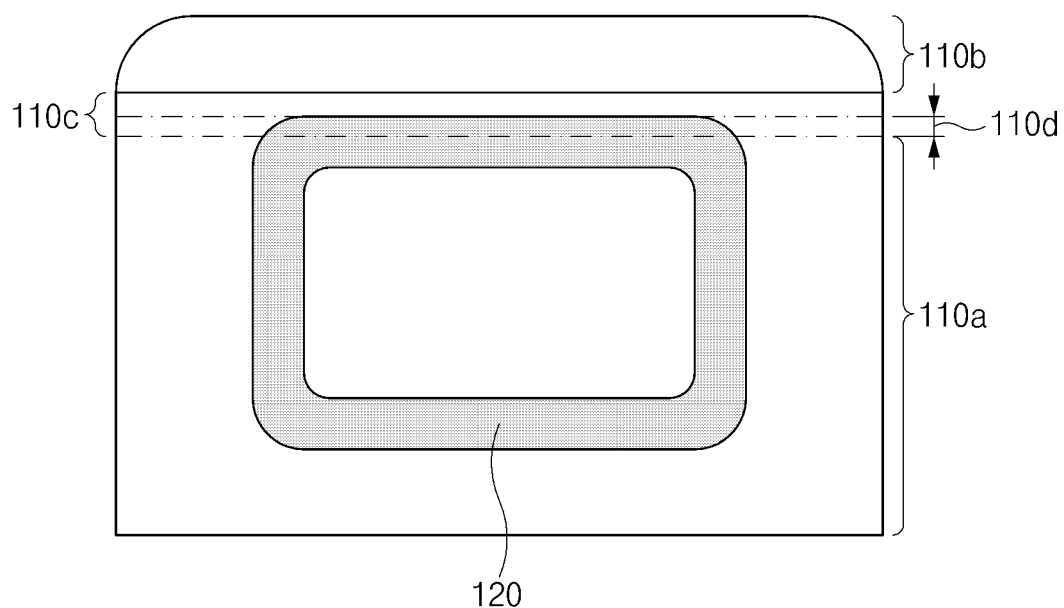
FIG. 6A illustrates a coil type radiator and a back cover according to an embodiment.
Figure 6B:
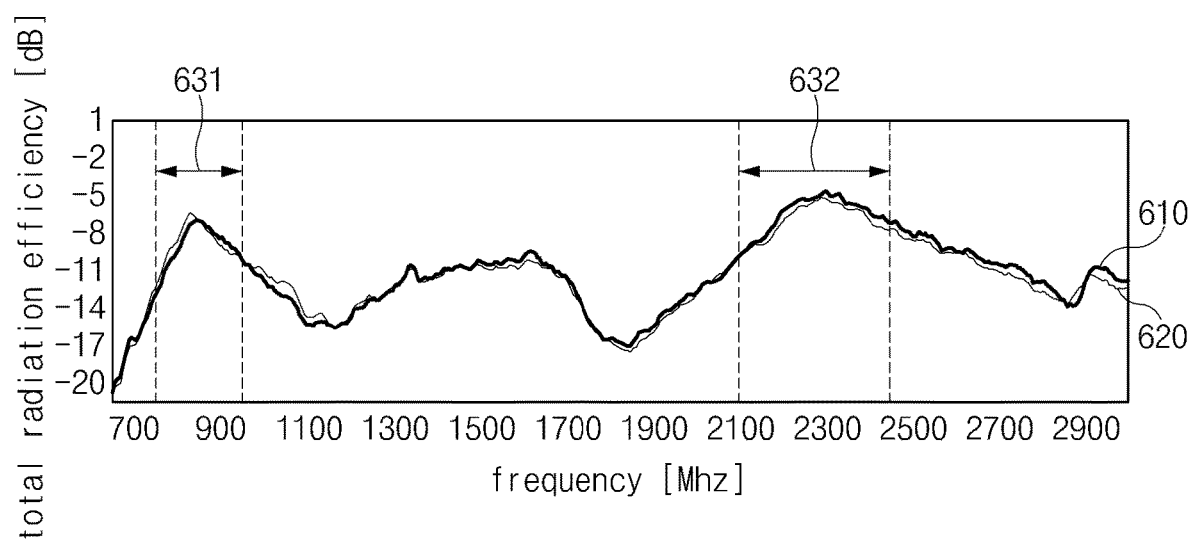
FIG. 6B illustrates radiation efficiency of an upper antenna according to an embodiment.

FIG. 6A illustrates a coil type radiator and a back cover according to an embodiment. FIG. 6B illustrates radiation efficiency of an upper antenna according to an embodiment. In FIGS. 6A and 6B, the second area 110b may operate as an upper antenna.

Referring to FIG. 6A, at least a portion of the coil type radiator 120 may be disposed between the first area 110a and the second area 110b of the back cover. For example, the first area 110a and the second area 110b may be spaced apart from each other by a specified distance. The at least a portion of the coil type radiator 120 may be disposed in an area that corresponds to the spacing. The rest of the coil type radiator 120 may be disposed in an area that corresponds to the first area 110a.

According to an embodiment, the insulation member 110c may be disposed in the spacing. According to an embodiment, the area where the insulation member 110c and the coil type radiator 120 overlap each other may have a small width 110d. For example, the width 110d of the area where the insulation member 110c and the coil type radiator 120 overlap each other may be less than about 1.5 mm. The gap between the coil type radiator 120 and the upper antenna may be large since the width 110d is small. Electromagnetic interference between the coil type radiator 120 and the upper antenna may decrease since the gap between the coil type radiator 120 and the upper antenna is large.

Referring to FIGS. 1 and 6B, a graph 610 shows radiation efficiency of the upper antenna when the electronic device 100 (e.g., the electronic device 100 of FIG. 1) transmits and receives signals based on a first path (e.g., the first path ① of FIG. 1). A graph 620 shows radiation efficiency of the upper antenna when the electronic device 100 transmits and receives signals through the first path ① and a second path (e.g., the second path (2 of FIG. 1). Comparing the graph 610 and the graph 620, radiation efficiency of the upper antenna in a low frequency band 631 (e.g., 750 MHz to 950 MHz) for long range communication may be substantially the same as that in a high frequency band 632 (e.g., 2.1 GHz to 2.45 GHz) for long range communication. For example, the upper antenna will not be substantially affected by the first path ① and the second path ② even when the electronic device 100 transmits and receives signals through the first path ① and the second path ②.

Figure 7A:
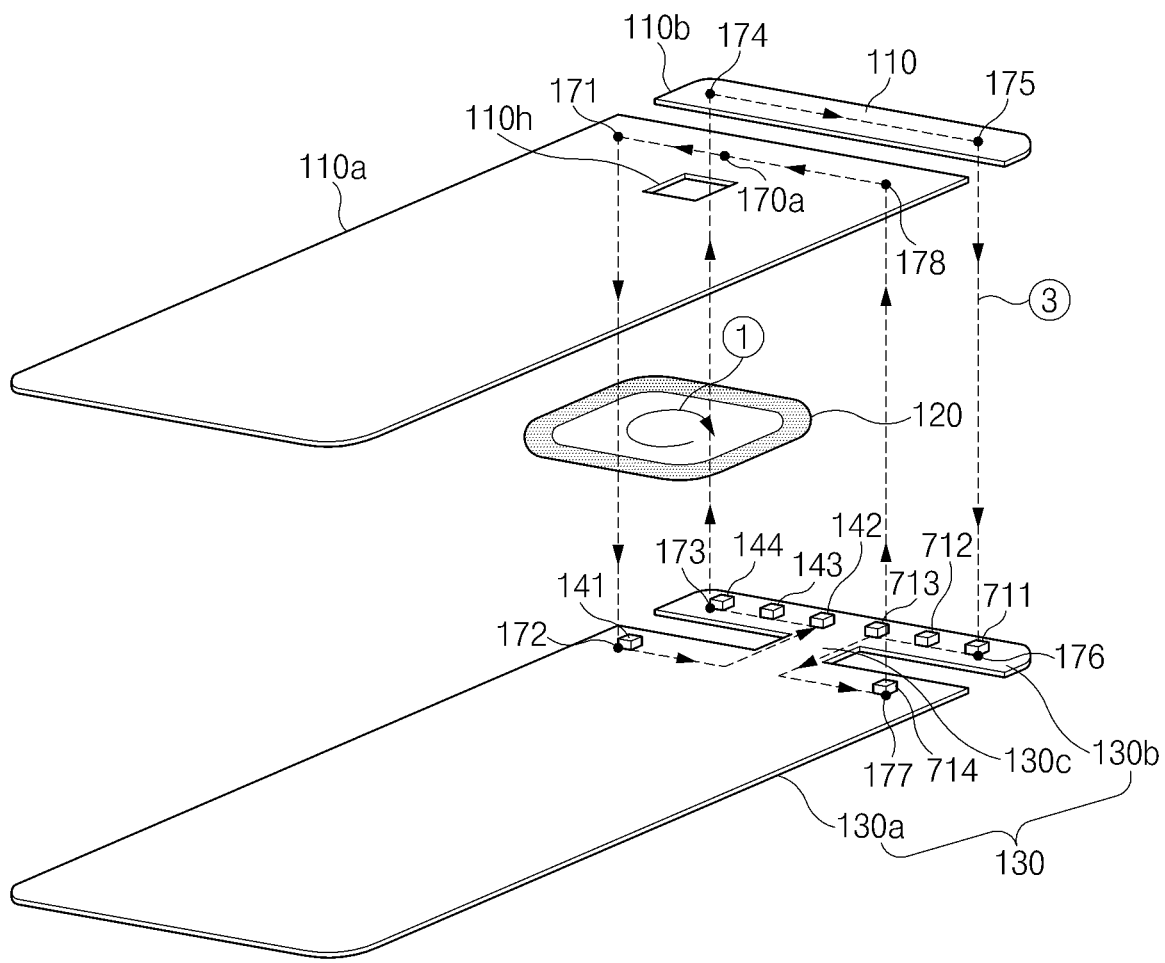
FIG. 7A illustrates an exploded perspective view of an electronic device according to another embodiment.
Figure 7B:
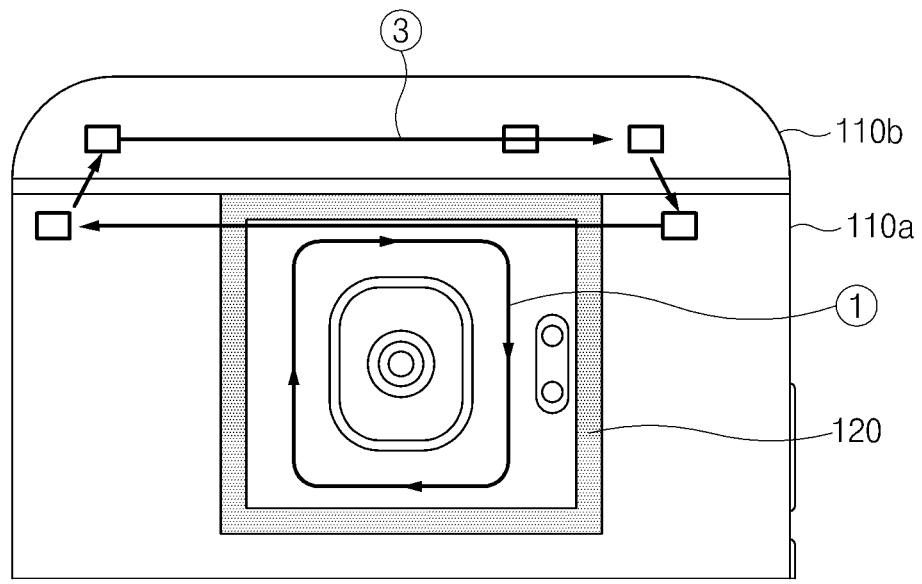
FIG. 7B illustrates a plan view of the electronic device according to an embodiment.

FIG. 7A illustrates an exploded perspective view of an electronic device according to another embodiment. FIG. 7B illustrates a plan view of the electronic device according to an embodiment. FIG. 7B is a plan view of an electronic device 700 illustrated in FIG. 7A.

Referring to FIGS. 7A and 7B, the electronic device 700 may include connecting members 141, 144, 711, and 714 and elements 142, 143, 712, and 713. For example, the at least one printed circuit board 130 may have a symmetric structure. For example, the connecting members 141, 144, 711, and 714 and the elements 142, 143, 712, and 713 may be arranged with respect to the third printed circuit board area 130c. The connecting members 141, 144, 711, and 714 may include, for example, a C-clip. The elements 142, 143, 712, and 713 may include, for example, an inductive element (e.g., an inductor) and a capacitive element (e.g., a capacitor).

According to an embodiment, when the communication circuit 145 feeds to the coil type radiator 120, a first current may flow in the coil type radiator 120 along a first path ① (or a first electrical path). According to another embodiment, a second current may flow by coupling when the communication circuit (e.g., the communication circuit 145 of FIG. 1) feeds to the coil type radiator 120. The second current may flow in the back cover 110 and the at least one printed circuit board 130 along a second path ③ (or a second electrical path). For example, the second current may flow from the point 170a corresponding to the coil type radiator 120 to the first point 171 and from the first point 171 to the second point 172 via the first connecting member 141. In another example, the second current may flow from the second point 172 to the third point 173 via the elements 142 and 143 and from the third point 173 to the fourth point 174 via the second connecting member 144.

According to an embodiment, the second current may flow from the fourth point 174 to a fifth point 175 via the second area 130b and from the fifth point 175 to a sixth point 176 through the third connecting member 711. In another example, the second current may flow from the sixth point 176 to a seventh point 177 via the elements 712 and 713 and from the seventh point 177 to an eighth point 178 via the fourth connecting member 714. The second current may flow back to the point 170*a*, which corresponds to the coil type radiator 120, from the eighth point 178 and may thus form a loop.

According to an embodiment, the electronic device 700 may transmit and receive signals in different frequency bands through the first path ① and the second path ③. According to another embodiment, the electronic device 700 may expand a bandwidth by transmitting and receiving signals through the first path ① and the second path ③. For example, the electronic device 700 may transmit and receive signals in a frequency band of 13.0 MHz to 23.6 MHz. According to an embodiment of the present disclosure, the types of electronic devices with which the electronic device 700 is able to communicate may be diversified since the bandwidth is expanded.

According to an embodiment of the present disclosure, the electronic device 100 may include the housing that includes the back cover 110 and the cover glass 160 facing away from the back cover 110, in which the back cover 110 includes the first area 110*a* having the first width 110-1, the second area 110*b* having the first width 110-1 and spaced apart from the first area 110*a* by the specified distance, and the third area 110*c* having the second width 110-3 smaller than the first width 110-1 and connecting the first area 110*a* and the second area 110*b*, the coil type radiator 120 disposed below the back cover 110, the at least one printed circuit board 130 disposed below the coil type radiator 120, the communication circuit 145 disposed on the at least one printed circuit board 130 and feeding to the coil type radiator 120, the first connecting member 141 connecting the first point 171 in the first area 110*a* and the second point 172 on the at least one printed circuit board 130, the second connecting member 144 connecting the third point 173 on the at least one printed circuit board 130 and the fourth point 174 in the second area 110*b*, and the one or more elements 142 and 143 disposed between the second point 172 and the third point 173 on the at least one printed circuit board 130. The communication circuit 145 may transmit/receive a signal in a first frequency band, based on the first electrical path ① formed by the coil type radiator 120 and may transmit/receive a signal in a second frequency band, based on the second electrical path ② formed by the first connecting member 141, the second connecting member 144, and the one or more elements 142 and 143.

According to an embodiment of the present disclosure, the first electrical path ① and the second electrical path ② may be electrically connected by coupling.

According to an embodiment of the present disclosure, the second electrical path ② may correspond to a loop that connects the first point 171, the second point 172, the third point 173, the fourth point 174, and the third area 110*c*.

According to an embodiment of the present disclosure, the one or more elements 142 and 143 may include an inductive element and a capacitive element.

According to an embodiment of the present disclosure, the at least one printed circuit board 130 may include the first printed circuit board area 130*a* disposed between the first area 110*a* and the cover glass 160 and the second printed circuit board area 130*b* disposed between the second area 110*b* and the cover glass 160.

According to an embodiment of the present disclosure, at least some of the one or more elements 142 and 143 may be disposed on the second printed circuit board area 130*b*.

According to an embodiment of the present disclosure, the electronic device 100 may further include the additional elements 712 and 713 opposite to the one or more elements with respect to the third area 110*c*, and the second electrical path ② may be formed through the additional elements 712 and 713.

According to an embodiment of the present disclosure, the electronic device 100 may further include the insulation member disposed between the first area 110*a* and the second area 110*b* and surrounding the third area 110*c*.

According to an embodiment of the present disclosure, at least a portion of the coil type radiator 120 may be disposed in an area that corresponds to the insulation member.

According to an embodiment of the present disclosure, the communication circuit 145 may feed to the second area 110*b* and may transmit/receive a signal in a third frequency band through an electrical path formed through the second area 110*b*.

According to an embodiment of the present disclosure, the electronic device 100 may include the housing that includes the back cover 110 and the cover glass 160 facing away from the back cover 110, the coil type radiator 120 disposed between the back cover 110 and the cover glass 160, the printed circuit board 130 disposed between the coil type radiator 120 and the cover glass 160, the communication circuit 145 disposed on the printed circuit board 130 and feeding to the coil type radiator 120, the first connecting member 141 connecting the first point 171 on the back cover 110 and the second point 172 on the printed circuit board 130, the second connecting member 144 connecting the third point 173 on the printed circuit board 130 and the fourth point 174 on the back cover 110, and the one or more elements 142 and 143 disposed between the second point 172 and the third point 173 on the printed circuit board 130. The communication circuit 145 may transmit/receive a signal in a first frequency band, based on the first electrical path ① formed by the coil type radiator 120 and may transmit/receive a signal in a second frequency band, based on the second electrical path ② formed by the first connecting member 141, the second connecting member 144, and the one or more elements 142 and 143.

According to an embodiment of the present disclosure, the back cover 110 may include the first area 110*a*, the second area 110*b* spaced apart from the first area 110*a* by the specified distance, and the third area 110*c* connecting the first area 110*a* and the second area 110*b*. The first point 171 may be located in the first area 110*a*, and the fourth point 174 may be located in the second area 110*b*.

According to an embodiment of the present disclosure, the second electrical path ② may be formed through the first point 171, the second point 172, the third point 173, and the fourth point 174.

According to an embodiment of the present disclosure, the first electrical path ① and the second electrical path ② may be electrically connected by coupling.

According to an embodiment of the present disclosure, a slit may be formed in at least a partial area of the printed circuit board 130.

According to an embodiment of the present disclosure, the electronic device 100 may further include the insulation material disposed in the slit.

According to an embodiment of the present disclosure, the electronic device 100 may include the back cover 110 that includes the first area 110*a*, the second area 110*b* spaced apart from the first area 110*a* by the specified distance, and the third area 110*c* connecting the first area 110*a* and the second area 110*b*, the cover glass 160 facing away from the back cover 110, the first printed circuit board area 130*a* disposed between the first area 110*a* and the cover glass 160, the second printed circuit board area 130b disposed between the second area 110b and the cover glass 160, the coil type radiator 120 disposed between the back cover 110 and the first printed circuit board area 130a, the communication circuit 145 disposed on the first printed circuit board area 130a and feeding to the coil type radiator 120, the first connecting member 141 connecting the first point 171 in the first area 110a and the second point 172 on the first printed circuit board area 130a, the second connecting member 144 connecting the third point 173 on the second printed circuit board area 130b and the fourth point 174 in the second area 110b, and the one or more elements 142 and 143 disposed between the second point 172 and the third point 173. The communication circuit 145 may transmit/receive a signal in a first frequency band, based on the first electrical path ① formed by the coil type radiator 120 and may transmit/receive a signal in a second frequency band, based on the second electrical path ② formed by the first point 171, the second point 172, the third point 173, and the fourth point 174.

According to an embodiment of the present disclosure, the first printed circuit board area 130a and the second printed circuit board area 130b may be electrically connected through specified interconnection wiring.

According to an embodiment of the present disclosure, a slit may be formed in at least a partial area between the first printed circuit board area 130a and the second printed circuit board area 130b.

According to an embodiment of the present disclosure, the coil type radiator 120 may be attached to the back cover 110 through an adhesive material.

According to an embodiment of the present disclosure, the electronic device 100 may include the housing that includes the front plate 160, the back plate 110 facing away from the front plate 160, and the side member surrounding the space between the front plate 160 and the back plate 110, in which the side member is integrally formed with, or attached to, the back plate 110, the back plate 110 includes the first conductive portion including the first periphery and the opening 110h adjacent to the first periphery, the second conductive portion including the second periphery extending substantially parallel to the first periphery, and the non-conductive portion disposed between the first periphery and the second periphery and making contact with the first periphery and the second periphery, and the first conductive portion, the second conductive portion, and the non-conductive portion form at least a portion of the outer surface of the back plate 110, the touch screen display 150 exposed through the front plate 160, the conductive pattern 120 surrounding the opening 110h of the first conductive portion and located in the space when viewed from above the back plate 110, the near field communication circuit 145 electrically connected with the conductive pattern 120, the first conductive path connecting the first point in the first conductive portion and the second point in the second conductive portion and formed in the space, in which the second point is located substantially opposite to the first point with respect to the non-conductive portion, the second conductive path formed inside the back plate 110 and connected between the third point of the first conductive portion and the fourth point of the second conductive portion, in which the third point is spaced apart from the first point by the first distance along the first periphery and the fourth point is spaced apart from the second point by the second distance along the second periphery, and the processor electrically connected with the touch screen display 150 and the near field communication circuit 145. The first conductive path, at least a portion of the first conductive portion between the first point and the third point along the first periphery, the second conductive path, and at least a portion of the second conductive portion between the fourth point and the second point along the second periphery may form a closed loop.

According to an embodiment of the present disclosure, the first conductive path may further include a capacitance element and an inductance element that are connected in series between the first point and the second point.

According to an embodiment of the present disclosure, the electronic device 100 may further include a first flexible conductive member connecting a first end portion of the first conductive path and the first point and a second flexible conductive member connecting a second end portion of the first conductive path and the second point.

According to an embodiment of the present disclosure, at least one of the first flexible conductive member and the second conductive member may include a pogo pin.

According to an embodiment of the present disclosure, the second conductive path may include a conductive layer integrally formed with the first conductive portion and the second conductive portion.

According to an embodiment of the present disclosure, the electronic device 100 may further include the printed circuit board (PCB) 130 located between the back plate 110 and the touch screen display 150, and at least a portion of the first conductive path may be formed on or inside the printed circuit board 130.

According to an embodiment of the present disclosure, when viewed from above the back plate 110, at least a portion of the first conductive path may include a first sub-path extending along the first periphery between the first point and the third point, a second sub-path extending along the second periphery between the second point and the fourth point, and a third sub-path extending between the third point and the fourth point.

According to an embodiment of the present disclosure, the electronic device 100 may further include a camera module disposed between the back plate 110 and the printed circuit board 130.

Figure 8:
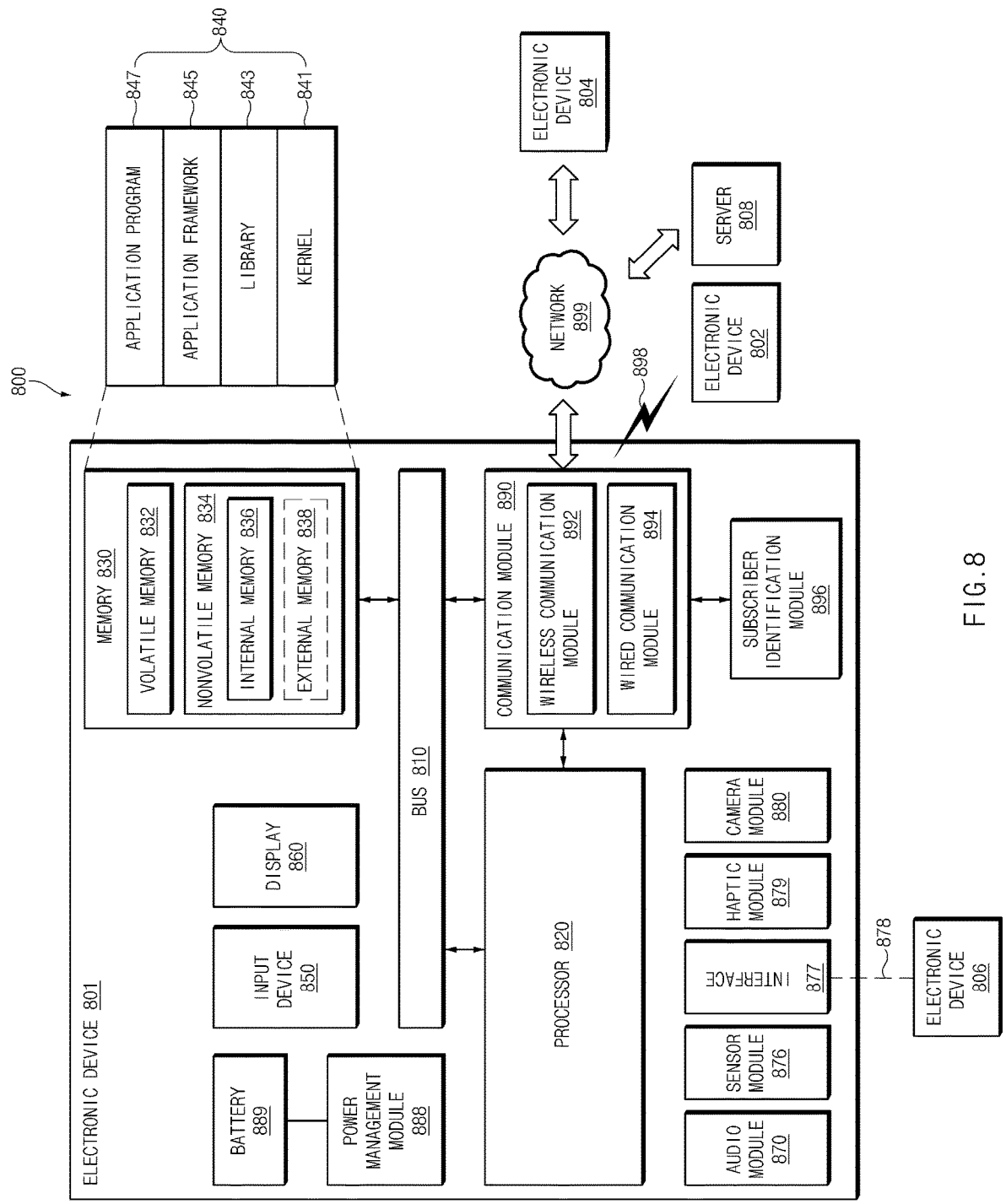
FIG. 8 illustrates an electronic device in a network environment according to various embodiments.

FIG. 8 illustrates a block diagram of an electronic device in a network environment, according to various embodiments.

An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 8, under a network environment 800, an electronic device 801 (e.g., the electronic device 100) may communicate with an electronic device 802 through local wireless communication 898 or may communication with an electronic device 804 or a server 808 through a network 899. According to an embodiment, the electronic device 801 may communicate with the electronic device 804 through the server 808.

According to an embodiment, the electronic device 801 may include a bus 810, a processor 820, a memory 830, an input device 850 (e.g., a micro-phone or a mouse), a display device 860, an audio module 870, a sensor module 876, an interface 877, a haptic module 879, a camera module 880, a power management module 888, a battery 889, a communication module 890 (e.g., the communication circuit 145), and a subscriber identification module 896. According to an embodiment, the electronic device 801 may not include at least one (e.g., the display device 860 or the camera module 880) of the above-described elements or may further include other element(s).

The bus 810 may interconnect the above-described elements 820 to 890 and may include a circuit for conveying signals (e.g., a control message or data) between the above-described elements.

The processor 820 may include one or more of a central processing unit (CPU), an application processor (AP), a graphic processing unit (GPU), an image signal processor (ISP) of a camera or a communication processor (CP). According to an embodiment, the processor 820 may be implemented with a system on chip (SoC) or a system in package (SiP). For example, the processor 820 may drive an operating system (OS) or an application to control at least one of another element (e.g., hardware or software element) connected to the processor 820 and may process and compute various data. The processor 820 may load a command or data, which is received from at least one of other elements (e.g., the communication module 890), into a volatile memory 832 to process the command or data and may store the result data into a nonvolatile memory 834.

The memory 830 may include, for example, the volatile memory 832 or the nonvolatile memory 834. The volatile memory 832 may include, for example, a random access memory (RAM) (e.g., a dynamic RAM (DRAM), a static RAM (SRAM), or a synchronous DRAM (SDRAM)). The nonvolatile memory 834 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 834 may be configured in the form of an internal memory 836 or the form of an external memory 838 which is available through connection only if necessary, according to the connection with the electronic device 801. The external memory 838 may further include a flash drive such as compact flash (CF), secure digital (SD), micro secure digital (Micro-SD), mini secure digital (Mini-SD), extreme digital (xD), a multimedia card (MMC), or a memory stick. The external memory 838 may be operatively or physically connected with the electronic device 801 in a wired manner (e.g., a cable or a universal serial bus (USB)) or a wireless (e.g., Bluetooth) manner.

For example, the memory 830 may store, for example, at least one different software element, such as a command or data associated with the program 840, of the electronic device 801. The program 840 may include, for example, a kernel 841, a library 843, an application framework 845 or an application program (interchangeably, "application") 847.

The input device 850 may include a microphone, a mouse, or a keyboard. According to an embodiment, the keyboard may include a keyboard physically connected or a virtual keyboard displayed through the display 860.

The display 860 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 801.

The audio module 870 may convert, for example, from a sound into an electrical signal or from an electrical signal into the sound. According to an embodiment, the audio module 870 may acquire sound through the input device 850 (e.g., a microphone) or may output sound through an output device (not illustrated) (e.g., a speaker or a receiver) included in the electronic device 801, an external electronic device (e.g., the electronic device 802 (e.g., a wireless speaker or a wireless headphone)) or an electronic device 806 (e.g., a wired speaker or a wired headphone) connected with the electronic device 801

The sensor module 876 may measure or detect, for example, an internal operating state (e.g., power or temperature) of the electronic device 801 or an external environment state (e.g., an altitude, a humidity, or brightness) to generate an electrical signal or a data value corresponding to the information of the measured state or the detected state. The sensor module 876 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 876 may further include a control circuit for controlling at least one or more sensors included therein. According to an embodiment, the sensor module 876 may be controlled by using the processor 820 or a processor (e.g., a sensor hub) separate from the processor 820. In the case that the separate processor (e.g., a sensor hub) is used, while the processor 820 is in a sleep state, the separate processor may operate without awakening the processor 820 to control at least a portion of the operation or the state of the sensor module 876.

According to an embodiment, the interface 877 may include a high definition multimedia interface (HDMI), a universal serial bus (USB), an optical interface, a recommended standard 232 (RS-232), a D-subminiature (D-sub), a mobile high-definition link (MI-IL) interface, a SD card/MMC (multi-media card) interface, or an audio interface. A connector 878 may physically connect the electronic device 801 and the electronic device 806. According to an embodiment, the connector 878 may include, for example, an USB connector, an SD card/MMC connector, or an audio connector (e.g., a headphone connector).

The haptic module 879 may convert an electrical signal into mechanical stimulation (e.g., vibration or motion) or into electrical stimulation. For example, the haptic module 879 may apply tactile or kinesthetic stimulation to a user. The haptic module 879 may include, for example, a motor, a piezoelectric element, or an electric stimulator.

The camera module 880 may capture, for example, a still image and a moving picture. According to an embodiment, the camera module 880 may include at least one lens (e.g., a wide-angle lens and a telephoto lens, or a front lens and a rear lens), an image sensor, an image signal processor, or a flash (e.g., a light emitting diode or a xenon lamp).

The power management module 888, which is to manage the power of the electronic device 801, may constitute at least a portion of a power management integrated circuit (PMIC).

The battery 889 may include a primary cell, a secondary cell, or a fuel cell and may be recharged by an external power source to supply power at least one element of the electronic device 801.

The communication module 890 may establish a communication channel between the electronic device 801 and an external device (e.g., the first external electronic device 802, the second external electronic device 804, or the server 808). The communication module 890 may support wired communication or wireless communication through the established communication channel. According to an embodiment, the communication module 890 may include a wireless communication module 892 or a wired communication module 894. The communication module 890 may communicate with the external device through a first network 898 (e.g. a wireless local area network such as Bluetooth or infrared data association (IrDA)) or a second network 899 (e.g., a wireless wide area network such as a cellular network) through a relevant module among the wireless communication module 892 or the wired communication module 894.

The wireless communication module 892 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

In certain embodiments, the wireless communication module 892 can feed an NFC coil antenna, resulting in a second current flowing one a path from a printed circuit board to a back board. The second current and path from the printed circuit board to the back board can be used to communicate using another frequency band different from the NFC frequency band.

According to an embodiment, when the wireless communication module 892 supports cellar communication, the wireless communication module 892 may, for example, identify or authenticate the electronic device 801 within a communication network using the subscriber identification module (e.g., a SIM card) 896. According to an embodiment, the wireless communication module 892 may include a communication processor (CP) separate from the processor 820 (e.g., an application processor (AP)). In this case, the communication processor may perform at least a portion of functions associated with at least one of elements 810 to 896 of the electronic device 801 in substitute for the processor 820 when the processor 820 is in an inactive (sleep) state, and together with the processor 820 when the processor 820 is in an active state. According to an embodiment, the wireless communication module 892 may include a plurality of communication modules, each supporting only a relevant communication scheme among cellular communication, local wireless communication, or a GNSS communication.

The wired communication module 894 may include, for example, include a local area network (LAN) service, a power line communication, or a plain old telephone service (POTS).

For example, the first network 898 may employ, for example, Wi-Fi direct or Bluetooth for transmitting or receiving commands or data through wireless direct connection between the electronic device 801 and the first external electronic device 802. The second network 899 may include a telecommunication network (e.g., a computer network such as a LAN or a WAN, the Internet or a telephone network) for transmitting or receiving commands or data between the electronic device 801 and the second electronic device 804.

According to various embodiments, the commands or the data may be transmitted or received between the electronic device 801 and the second external electronic device 804 through the server 808 connected with the second network 899. Each of the first and second external electronic devices 802 and 804 may be a device of which the type is different from or the same as that of the electronic device 801. According to various embodiments, all or a part of operations that the electronic device 801 will perform may be executed by another or a plurality of electronic devices (e.g., the electronic devices 802 and 804 or the server 808). According to an embodiment, in the case that the electronic device 801 executes any function or service automatically or in response to a request, the electronic device 801 may not perform the function or the service internally, but may alternatively or additionally transmit requests for at least a part of a function associated with the electronic device 801 to any other device (e.g., the electronic device 802 or 804 or the server 808). The other electronic device (e.g., the electronic device 802 or 804 or the server 808) may execute the requested function or additional function and may transmit the execution result to the electronic device 801. The electronic device 801 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 830).

The term "module" used herein may include a unit, which is implemented with hardware, or hardware programmed with software, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 830) in the form of a program module. The instruction, when executed by a processor (e.g., a processor 820), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a back cover comprising:
   a first area having a first width;
   a second area having the first width and spaced apart from the first area by a specified distance; and
   a third area having a second width smaller than the first width and connecting the first area and the second area;
   a cover glass facing away from the back cover,
   a coil type radiator disposed between the back cover and the cover glass;
   at least one printed circuit board disposed between the coil type radiator and the cover glass;
   a communication circuit disposed on the at least one printed circuit board and configured to feed to the coil type radiator;
   a first connecting member configured to connect a first point in the first area of the back cover and a second point on the at least one printed circuit board;
   a second connecting member configured to connect a third point on the at least one printed circuit board and a fourth point in the second area of the back cover; and
   one or more elements disposed between the second point and the third point on the at least one printed circuit board, wherein the communication circuit transmits or receives a signal in a first frequency band, based on a first electrical path formed by the coil type radiator and transmits or receives a signal in a second frequency band, based on a second electrical path formed by the first connecting member, the second connecting member, and the one or more elements, wherein the third area is covered by an insulation member, wherein a first portion of the coil type radiator is disposed between the first area and the second area of the back cover, wherein the first portion of the coil type radiator overlaps with the insulation member, wherein a second portion different from the first portion of the coil type radiator is disposed in the first area, wherein an area where the insulation member and the coil type radiator overlap each other has a width less than a predetermined first value, wherein a gap between the coil type radiator and the second area has a second value, wherein the second area is referred to as an upper antenna, and wherein the second value increases as the first value decreases.

2. The electronic device of claim 1, wherein the first electrical path and the second electrical path are electrically connected by coupling.

3. The electronic device of claim 1, wherein the second electrical path corresponds to a loop that connects the first point, the second point, the third point, the fourth point, and the third area.

4. The electronic device of claim 1, wherein the one or more elements include an inductive element and a capacitive element.

5. The electronic device of claim 1, wherein the at least one printed circuit board includes:

a first printed circuit board disposed between the first area and the cover glass; and a second printed circuit board disposed between the second area and the cover glass.

6. The electronic device of claim 5, wherein at least some of the one or more elements are disposed on the second printed circuit board.

7. The electronic device of claim 1, wherein the one or more elements are disposed to one side of the third area, and the electronic device further comprises:

additional elements disposed to a side opposite to the one side of the third area, wherein the second electrical path is formed through the additional elements.

8. The electronic device of claim 1, wherein the communication circuit feeds to the second area and transmits/receives a signal in a third frequency band through an electrical path formed through the second area.

* * * * *